Patented July 19, 1938

2,124,295

UNITED STATES PATENT OFFICE 2,124,295

ALLANTOIN OINTMENT

Frederick R. Greenbaum, Philadelphia, Pa., assignor to The National Drug Company, Philadelphia, Pa., a corporation of Pennsylvania No Drawing. Application November 9, 1935, Serial No. 49,033

14 Claims. (Cl. 167—63)

The object of the invention is primarily to prepare a composition comprising allantoin in proportions greater than the maximum which is possible in a saturated aqueous solution, and more particularly to prepare such composition in the form of an ointment, in which the allantoin is uniformly distributed, and will not crystallize when chilled nor deteriorate in high sunlight.

By way of explanation, it has long been known that maggots in infested or infected wounds secrete a definite substance, which stimulates the growth of vascular granulations, after removing necrotic tissue and reducing infection, thereby cleansing the wound and placing it in a healthy, healing condition.

The characteristic substance in the allantoic fluid is allantoin, and the former is a constituent of the urinary secretions of surgical maggots, or an end product of purine metabolism, which arthropods like most other animals secrete through or from their intestines, and is directly the result of the disintegration or oxidation of uric acid in an alkaline medium, being characterized by an alkaline reaction sometimes as high as pH 8.2.

Fortunately, while the first experiments in the therapeutic use of allantoin were conducted with this substance obtained from animal secretions, allantoin can now be obtained commercially, being produced by chemical synthesis from uric acid. In the maggot-infested wounds, as the amount of allantoin is necessarily low, and is further diluted with the serous discharge from the wound, it is quite obvious that no great concentration of the substance is ordinarily present, but in spite of which fact markedly accelerated healing has been noted for many years under the most adverse conditions as to foreign matter in an initial infection of the wound.

The type of cases in which allantoin treatment has been exceedingly efficacious include chronic non-healing wounds with oedematous, indolent tissues lining the wounds, poor in circulation and discharging pus; chronic ulcers; extensive burns; wounds in which the suppuration had already been reduced but with little granulation; osteomyelitis; sloughing ulcers of the leg; pruritus ani or pruritus vulvae; carbuncles; gangrene; and many others in which tissue granulation is desired.

In many if not all of these cases, however, it was felt that more rapid tissue granulation would be assured, if it were only possible to apply the allantoin in a higher concentration, than that heretofore available in the form of a solution.

In water, allantoin is soluble only to 0.6%, which is the maximum concentration by this medium. The best concentration reported by William Robinson, Ph. D., of the Division of Insects Affecting Man and Animals, Bureau of Entomology and Plant Quarantine, United States Department of Agriculture, Washington, D. C., was 0.5% in water.

Allantoin is usually obtainable in crystalline form and is bland, stable, harmless, odorless and non-staining. Heretofore, the most satisfactory method of preparation consisted in heating a flask of water to near the boiling point; then adding the allantoin and gently stirring and heating without boiling until the crystals are dissolved. The solution cannot be autoclaved or boiled without a resultant chemical change, and should not be chilled as in a refrigerator, as the allantoin easily crystallizes out, while it is also advisable to keep it away from excessive sunlight.

In order to obtain higher concentrations than 0.5%, various methods of combining allantoin with other substances were tried, including the possibilities offered by an ointment form. Here again, various methods of preparation had to be experimented with, until there was discovered a process whereby any desired concentration can be obtained. In carrying out this process in its preferred form, approximately 630 grams of stearic acid is melted at water bath temperature, and then held at a temperature of substantially 70° C. Separately, about 500 cc. of distilled water is heated to almost but not quite boiling temperature (at sea level), and to this heated water approximately 40 grams of allantoin is added and stirred until all of the latter is in solution.

To the solution of allantoin, substantially 400 grams of glycerine and substantially 20 grams of triethanolamine are finally added. The resulting aqueous glycerine-triethanolamine solution of allantoin is then brought to a temperature of approximately 70° C., and gradually poured with constant stirring into the melted stearic acid, which has been maintained at substantially 70° C. Slow stirring is continued until a white, uniform ointment is obtained, after which sufficient additional water also at substantially 70° C. is added to bring the total weight to 2,000 grams. This provides an ointment in a greaseless base, containing approximately 2% allantoin uniformly distributed and suspended in solution and both in colloidal and crystalline form, or in other words, providing a combined colloidal dispersion and minute crystal form of allantoin throughout the greaseless base. When higher concentrations are desired, a greater amount, in fact, much larger amounts of allantoin may be dissolved in the boiling water, practically any desired percentage of allantoin in the ointment being possible.

From the proportions of triethanolamine and stearic acid used it will be apparent from their molecular weights of 284 and 140, respectively, that these substances will combine to produce triethanolamine-stearate and an excess of stearic acid in the final ointment. Such an excess of acid is a definite prerequisite of a highly successful ointment of the type produced by the applicant, as such an excess insures a permanently acid condition, and thereby prevents a loss of potency (i. e., healing effect) in the presence of free alkalies. For instance, should an exact chemical balance of stearic acid and triethanolamine be used in accordance with their respective molecular weights, any water or even the exudate from the wound would cause an alkaline reaction, thereby offsetting or nullifying the effectiveness of the product and it is just such a condition that the excess of acid precludes.

Clinically, the 2% and the 5% allantoin ointments have been extensively tried, and as was anticipated, the healing results have been found to be far superior to that of the 0.5% or 0.6% solutions. It is believed, furthermore, that in certain types of wounds much higher concentrations of allantoin in the ointment form, as above provided for, will prove proportionately advantageous in stimulating the growth of vascular granulations, removing necrotic tissue and reducing infection, thereby cleansing the wound and bringing about a desired healthy condition requisite to rapid healing.

Having thus described my invention what I claim as new and desire to secure by Letters Patent is:—

1. An ointment, containing triethanolamine stearate, an excess of stearic acid sufficient to maintain the ointment acid in reaction, and allantoin particles as minute as colloids dispersed therein.

2. An ointment, containing triethanolamine stearate, an excess of stearic acid sufficient to maintain the ointment acid in reaction, and more than 0.6% allantoin colloidally dispersed therein.

3. An ointment, containing triethanolamine stearate, an excess of stearic acid sufficient to maintain the ointment acid in reaction, glycerine and allantoin colloidally dispersed therein.

4. An ointment, containing triethanolamine stearate, an excess of stearic acid sufficient to maintain the ointment acid in reaction, glycerine, and more than 0 6% of allantoin colloidally dispersed therein.

5. A two-percent allantoin ointment, containing approximately 590 grams of excess stearic acid, 40 grams of allantoin, 400 grams of glycerine, 60 grams of triethanolamine-stearate, and water, said allantoin after cooling being colloidally dispersed throughout the ointment.

6. A two-percent to five-percent allantoin ointment, containing approximately 590 grams of excess stearic acid, from 40 to 100 grams of allantoin, 400 grams of glycerine, 60 grams of triethanolamine-stearate, and water, said allantoin after cooling being colloidally dispersed throughout the ointment.

7. An allantoin ointment, containing 590 grams of excess stearic acid, 400 grams of glycerine, 60 grams of triethanolamine-stearate, water, and allantoin, said allantoin after cooling being colloidally dispersed throughout the ointment.

8. An allantoin ointment, containing 590 grams of excess stearic acid, 400 grams of glycerine, 60 grams of triethanolamine-stearate, water, and sufficient allantoin to provide a specific percentage of concentration, said allantoin after cooling being colloidally dispersed throughout the ointment.

9. The process of preparing a greaseless allantoin ointment, which consists in melting 630 grams of stearic acid at water bath temperature and holding the same at substantially 70° C., separately dissolving 40 grams of allantoin crystals in 500 cc. distilled water heated to slightly below the boiling point at sea level, adding 400 grams of glycerine and 20 grams of triethanolamine to the allantoin solution, said aqueous glycerine-triethanolamine solution of allantoin being raised to a temperature of 70° C., and then poured with slow and constant stirring into the melted stearic acid, said stirring being continued until a white, uniform ointment is obtained, to provide 60 grams of triethanolamine-stearate and 590 grams excess stearic acid, and to produce upon cooling minute crystals, a solution and a colloidal dispersion of the allantoin throughout the ointment.

10. The process of preparing a two-percent allantoin ointment, which consists in melting 630 grams of stearic acid at water bath temperature and holding the same at substantially 70° C., separately dissolving 40 grams of allantoin crystals in 500 cc. distilled water heated to slightly below the boiling point at sea level, adding 400 grams of glycerine and 20 grams of triethanolamine to the allantoin solution, said aqueous glycerine-triethanolamine solution of allantoin being raised to a temperature of 70° C., and then poured with slow and constant stirring into the melted stearic acid, said stirring being continued until a white, uniform ointment is obtained, to provide 60 grams of triethanolamine-stearate and 590 grams excess stearic acid after which sufficient additional water is added to bring the total weight to 2000 grams and upon cooling said allantoin being in solution, in minute crystals and colloidally dispersed throughout the mass.

11. An ointment, comprising the colloidal dispersion of allantoin in a greaseless base.

12. An ointment, comprising a base, and allantoin colloidally dispersed throughout said base.

13. An ointment, comprising a base throughout which more than 0.6% allantoin is dispersed in the form of a solution and minute particles.

14. An ointment, comprising a base throughout which allantoin is dispersed in the form of a solution, minute crystals and colloids.

FREDERICK R. GREENBAUM.